INVENTOR.
George H. Beall

United States Patent Office 3,689,293
Patented Sept. 5, 1972

3,689,293
MICA GLASS-CERAMICS
George H. Beall, Corning, N.Y., assignor to Corning Glass Works, Corning, N.Y.
Filed July 8, 1970, Ser. No. 53,121
Int. Cl. C03c *3/22, 3/30;* C04b *33/00*
U.S. Cl. 106—39 DV
2 Claims

ABSTRACT OF THE DISCLOSURE

This invention relates to the production of fluorine mica glass-ceramic articles from glass articles in the composition system $SiO_2$-$B_2O_3$-$Al_2O_3$-$MgO$-$K_2O$-$F$ which are about 50–90% by volume crystalline, the crystals being related in structure and composition to the natural mineral phlogopite. These mica glass-ceramic products exhibit good machineability with steel tools, good mechanical strength and impact resistance, excellent thermal shock resistance, and superior dielectric properties.

---

Figure 1:
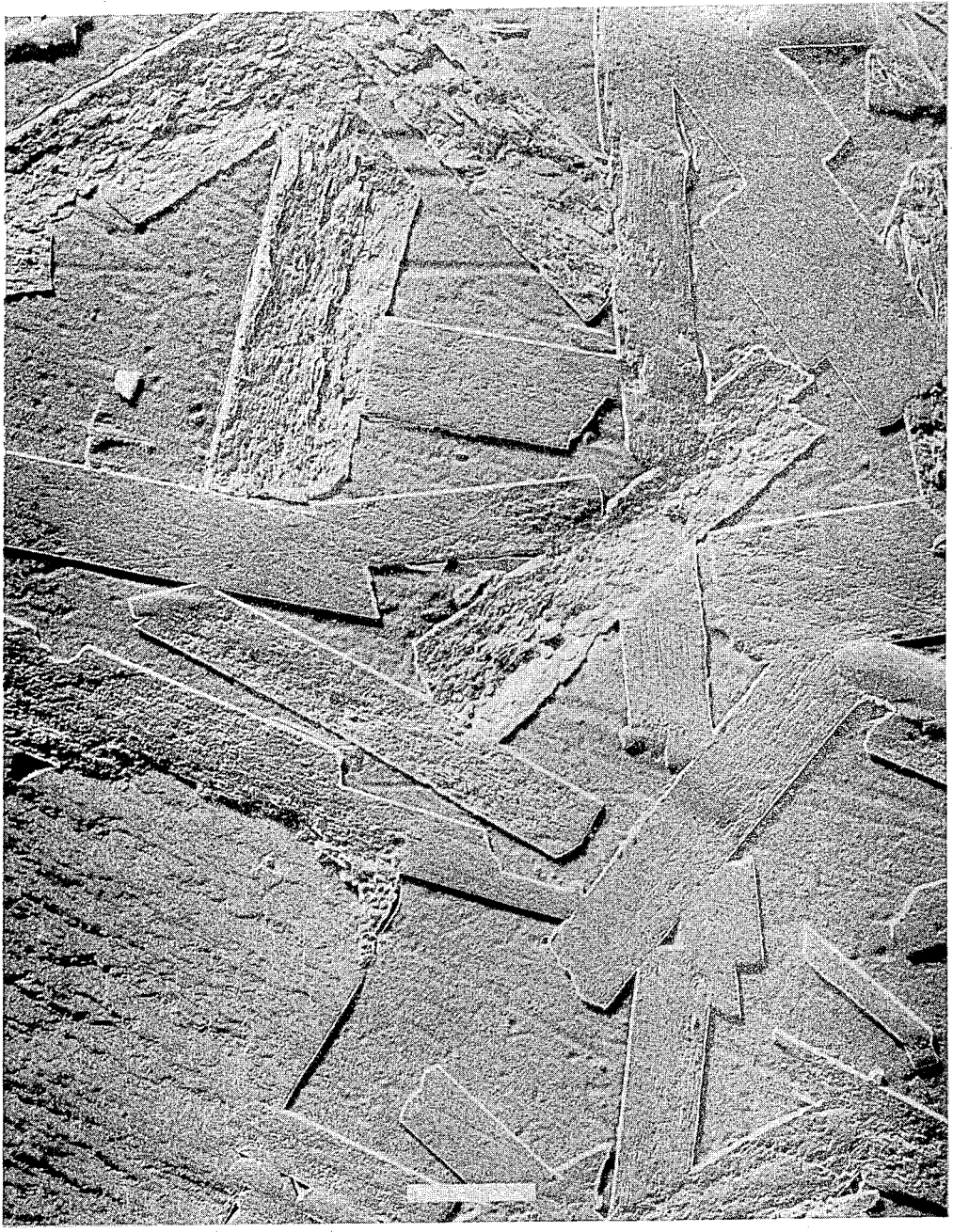

A glass-ceramic article results through the controlled crystallization in situ of a glass article. Hence, the manufacture of glass-ceramic articles normally involves these three general steps: first, a glass-forming batch is compounded to which a nucleating or crystallization-promoting agent is commonly admixed; second, this batch is melted to a homogeneous liquid and the melt simultaneously cooled and shaped to a glass article of desired dimensions and configuration; and, third, the glass article is heat treated in accordance with a specifically-defined time-temperature schedule such that nuclei are initially developed in the glass which act as sites for the growth of crystals thereon as the heat treatment proceeds.

Inasmuch as the crystallization in situ is brought about through the essentially simultaneous growth on countless nuclei, the structure of a glass-ceramic article comprises relatively uniformly-sized crystals homogeneously dispersed in a residual glassy matrix, these crystals constituting the predominant proportion of the article. Thus, glass-ceramic articles are frequently described as being at least 50% crystalline and, in numerous instances, are actually over 75% crystalline. In view of this very high crystallinity, the chemical and physical properties of glass-ceramic articles are normally materially different from those of the original glass and are more closely related to those demonstrated by the crystal phase. Finally, the residual glassy matrix will have a far different composition from that of the parent glass since the components making up the crystal phase will have been precipitated therefrom.

Because a glass-ceramic article is the result of the crystallization in situ of a glass article, conventional glass forming methods such as blowing, casting, drawing, pressing, rolling, spinning, etc. can usually be employed in securing the desired configuration to an article. Also, like glass, a glass-ceramic article is non-porous and free of voids.

United States Patent No. 2,920,971, the basic patent in the field of glass-ceramics, provides an extensive study of the practical aspects and theoretical considerations that must be understood in the manufacture of such articles as well as a discussion of the crystallization mechanism. Reference is made thereto for further explanation of these matters.

The micas comprise a family of silicate minerals that have a unique two-dimensional or sheet structure. Naturally-occurring mica consisting of large crystals can readily be split into thicknesses of 0.001″ or less. The property of flexibility, coupled with high dielectric strength, has made sheet mica a very important electrical insulating material.

Most naturally-occurring micas are hydroxyl silicates whereas most synthetic micas have been produced by replacing the hydroxyl groups within the structure with fluorine. Much research has been undertaken in the field of synthetic mica and this work can be categorized into five general areas: efforts to produce single crystals of fluorine mica, hot-pressed fluormica ceramics, glass-bonded fluormica ceramics, fusion cast mica materials, and, recently, fluormica glass-ceramics. This research has demonstrated that, whereas fine-grained, polycrystalline mica ceramics do not maintain the single crystal property of flexibility, these products can, nevertheless, possess excellent dielectric properties, thermal stability, and mechanical machineability.

The crystal structure of fluormica has been studied extensively with the generalized structural formula written as $X_{0.5-1}$-$Y_{2-3}Z_4O_{10}F_2$, where X represents cations which are relatively large in size, i.e., 1.0–1.6 A. radius, Y represents somewhat smaller cations, i.e., 0.6–0.9 A. radius, and Z represents small cations, 0.3–0.5 A. radius, which coordinate to four oxygens. The X cations are in dodecahedral coordination and the Y cations in octahedral coordination. The basic unit of the mica structure is the $Z_2O_5$ hexagonal sheet formed because each $ZO_4$ tetrahedron shares three of its corners with others in a plane. In the fluormicas, as for all micas, two $Z_2O_5$ sheets, each with their apical oxygens and associated interstitial fluoride ions directed toward each other, are bonded by the Y cations. These cations coordinate octahedrally to two oxygens and one fluorine from each $Z_2O_5$ sheet. The resultant mica layer has been called a 2 to 1 layer because it consists of two tetrahedral sheets with one octahedral sheet. The fluoride ions and the associated apical oxygens of the tetrahedral sheet offset the anions of the octahedral sheet. The mica layers themselves are bonded to each other by the relatively large X cations in the so-called interlayer sites. These X cations are normally potassium but are sometimes such other large alkali metal and alkaline earth cations as $Na^+$, $Rb^+$, $Cs^+$, $Ca^{+2}$, $Sr^{+2}$, and $Ba^{+2}$.

I have now discovered that glass-ceramic articles consisting essentially of fluormica crystals dispersed in a minor amount of residual glass can be produced from relatively stable opal glasses over a particularly-defined composition area consisting essentially, by weight on the oxide basis, of about 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O_3$, and 0–20% $Cs_2O$, 4–25% $MgO+0–7\%$ $Li_2O$, wherein the total $MgO+Li_2O$ consists of 6–25%, and 4–20% F. In the micas which crystallize from the glasses of this invention, the X, Y, and Z positions are normally filled according to the following ions: X position—K, Na, Rb, Cs; Y position—Mg, Al, Li; and Z position—Al, B, Si. The basic mica structure identified by X-ray diffraction analysis corresponds to a fluorophlogopite solid solution. The fluorophlogopite solid solution is believed to fall within the three components: normal fluorophlogopite, $KMg_3AlSi_3O_{10}F_2$, boron fluorophlogopite, $KMg_3BSi_3O_{10}F_2$, and a subpotassic aluminous phlogopite whose exact composition is unknown but which may approach a formula close to $$K_{0.5}Mg_2Al_{.83}BSi_3O_{10}(F_2)$$

In addition, considerable solid solution appears to exist between these phlogopite species and the lithia fluormicas, e.g., polylithionite, 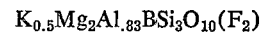$KLi_2AlSi_4O_{12}F_2$.

From a study of the bulk composition of the original glass and in view of the high crystallinity of the final products, viz, about 50–90% by volume, it is clear that the fluorophlogopite solid solution is deficient in X position cations, i.e., there is less than one large alkali metal ion per four network cations, and, in some instances, is also deficient in magnesium, i.e., some aluminum and/or boron ions substitute for the normally-present magnesium ions in the 6-fold or Y position.

Minor additions of other oxides to the base glass composition such as $P_2O_5$, $TiO_2$, $ZrO_2$, BaO, SrO, CaO, FeO, ZnO, CdO, $GeO_2$, $SnO_2$, and PbO can be tolerated to a total of about 10% by weight. $Rb_2O$ and/or $Cs_2O$ can replace some or even all of the sodium and/or potassium ions but such substitution appears to have no practical benefit and increases the expense of the batch. $Na_2O$ adversely affects the dielectric properties of the final article so the use of $K_2O$ is to be preferred.

The preferred composition area in terms of achieving optimum mechanical strength, dielectric properties, thermal shock resistance, and machineability contemplates 35–48% $SiO_2$, 5–15% $B_2O_3$, 14–22% $Al_2O_3$, 15–25% MgO, 3–8% $K_2O$, and 5–10% F.

In general terms, my invention comprises melting a batch for a glass consisting essentially, by weight on the oxide basis, of about 25–60% $SiO_2$, 15–35% $R_2O_3$, wherein $R_2O_3$ consists of 3–15% $B_2O_3$ and 5–25% $Al_2O_3$, 4–25% MgO+0–7%$Li_2O$, the total of MgO+$Li_2O$ being between about 6–25%, 2–20% $R_2O$, wherein $R_2O$ consists of 0–15% $Na_2O$, 0–15% $K_2O$, 0–15% $Rb_2O$, and 0–20% $Cs_2O$, and 4–20% F, simultaneously cooling the melt at least below the transformation range thereof and shaping a glass article therefrom, and thereafter heating this glass article to a temperature between about 750°–1100° C. for a sufficient length of time to obtain the desired crystallization in situ. The transformation range has been defined as that temperature at which a liquid melt is deemed to have been transformed into an amorphous solid; that temperature commonly being considered as lying between the strain point and annealing point of a glass. Inasmuch as the crystallization in situ is a process which is both time and temperature dependent, it can be readily understood that at temperatures approaching the hotter extreme of the crystallization range brief dwell periods only will be necessitated, e.g., ½ hour or even less; whereas, at temperatures in the cooler extreme of the heat treating range, dwell periods of up to 24–48 hours can be required to secure high crystallinity.

My preferred crystallization temperature practice contemplates two steps: (1) the glass article is first heated to a temperature somewhat above the transformation range thereof, e.g., about 750°–850° C., and maintained within those temperatures for a sufficient length of time to insure good nucleation and begin crystal development; and, thereafter, (2) this nucleated article is heated to a temperature between about 850°–1100° C. and held within that range for a sufficient period of time to expedite completion of the crystal growth. In this preferred practice, I normally employ a nucleation period of about 1–6 hours followed by a crystallization growth time of about 1–8 hours.

It will be appreciated that numerous modifications in the crystallization in situ process are available. For example, when the original batch melt is quenched below the transformation range thereof and shaped into a glass article, this glass article may be subsequently cooled to room temperature to permit visual inspection of the glass quality prior to initiating the heat treating schedule. However, where speed in production and fuel economies are sought, the batch melt can simply be cooled to a glass article at some temperature just below the transformation range and the crystallization treatment begun immediately thereafter.

Further, whereas a two-step heat treatment schedule is to be preferred, a very satisfactorily crystallized body can be achieved when the original glass article is merely heated from room temperature or the transformation range to temperatures within the 750°–1100° C. range and maintained within that range for a sufficient length of time to induce the desired crystallization. Also, it is apparent that no single hold temperature is necessary to secure satisfactory crystallization. Rather, the temperatures can vary at will within the crystallization range.

In still another embodiment, no definite dwell period at any specific temperature is necessary. Thus, if the rate of heating the glass body above the transformation range is relatively slow and the final crystallization temperature employed is near the hotter extreme of the crystallization range, no hold period, as such, at any one temperature will be required. However, inasmuch as the growth of crystals is dependent upon time and temperature, the rate at which the glass article is heated above the transformation range must not be so rapid that a growth of sufficient crystals to support the article will not have time to take place and the article will, consequently, deform and slump. Therefore, although heating rates of 10° C. per minute and higher have been utilized successfully, especially where physical supports for the glass bodies have been provided to minimize the deformation thereof, I prefer to employ heating rates of about 3°–5° C./minute. These heating rates have produced articles demonstrating very little, if any, deformation throughout the composition field operable in this invention.

The microstructure of the glass-ceramic article is of vital significance in determining the mechanical and electrical properties thereof. In compositions containing less than about 5% $B_2O_3$, the percentage of crystallinity can be as high as about 65% by volume but the aspect ratio of the crystals is not great, perhaps averaging about 3–4:1. This results in a product exhibiting some machineability but with good mechanical strength, sometimes demonstrating a modulus of rupture in excess of 20,000 p.s.i. FIG. 1 is an electron micrograph of an example of such microstructure, the white bar at the base of the micrograph indicating one micron. From that figure it can be seen that there is only limited interlocking of the mica crystals and, as would be expected, the dielectric properties, mechanical strength properties, and thermal shock resistance do not closely approach those of sheet mica.

Figure 2:
Figure 3:
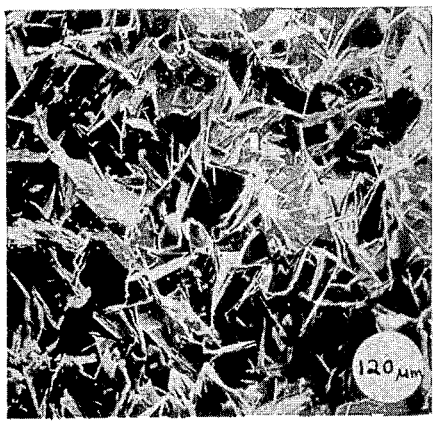
Figure 4:
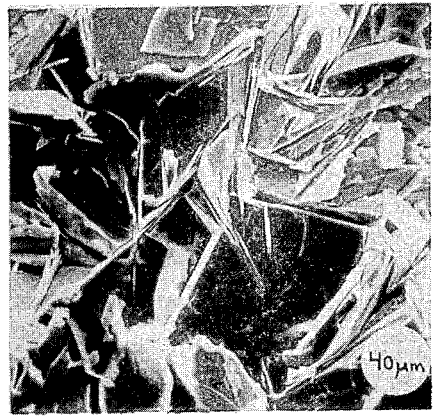
Figure 5:
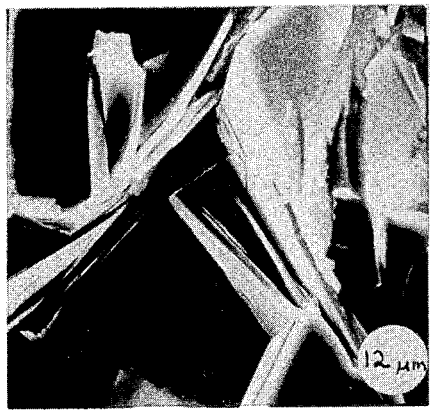
Figure 6:
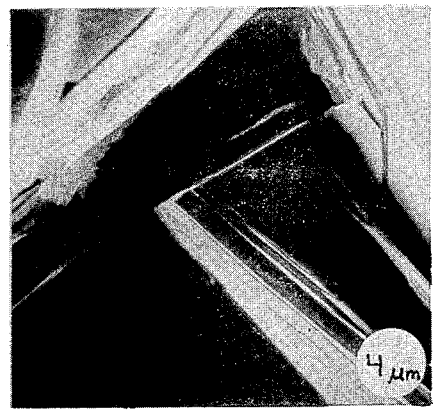

FIG. 2 is an electron micrograph illustrating the microstructure of the fluormica obtained through this invention utilizing $B_2O_3$ contents greater than 5% by weight, the white bar at the base of the micrograph again indicating one micron. Large interlocking platelets of mica with a high aspect ratio are readily apparent. The texture resembles a house of cards, as is demonstrated in the scanning electron microscope photographs comprising FIGS. 3–6, the small circle in the lower right corner of each photograph indicating size in millimicrons. This "house of cards" microstructure has manifested the best properties with respect to mechanical and thermal shock resistance and has provided dielectric properties approaching those of naturally-occurring sheet phlogopite.

As can easily be observed in the representative electron micrographs FIGS. 1 and 2, the residual glass in the fluormica glass-ceramics of this invention normally varies between about 30–45% by volume, although some glass compositions have been crystallized in situ to about 90% by volume crystalline. The residual glass is believed to have a boroaluminosilicate composition that is sometimes homogeneous, as is depicted in FIG. 1, or it may be phase separated, as is illustrated in FIG. 2.

The actual crystallization process comprises two steps: (1) when the glass body is reheated above the transformation range, precipitation of fluoride-containing crystals occurs; and then (2) further heating of the body at temperatures between about 750°–1100° C. causes the growth of fluormica crystals on the nuclei.

With glass compositions containing less than 5% by weight $B_2O_3$, magnesium fluoride (sellaite) is the first phase to crystallize and can be readily identified through X-ray diffraction analysis. With glass compositions containing more than 5% by weight $B_2O_3$, $MgF_2$ is normally not the first crystal phase to precipitate. Instead, fluoborite, is formed which is also readily identifiable through X-ray diffracion analyses. Like $MgF_2$, fluoborite is stoichiometric with a composition $Mg_3BO_3F_3$. Thus, X-ray diffraction patterns taken of glass bodies containing less than or more than 5% $B_2O_3$ after heat treatment at about 50°–100° C. above the transformation range will show magnesium fluoride or fluoborite, respectively. Subsequent heating to higher temperatures rapidly causes the production of fluormica as the primary crystal phase. The fluoborite tends to disappear as the amount of mica increases. In the case of compositions nucleated by $MgF_2$, there is also some tendency for the sellaite peak in the diffraction pattern to disappear during mica formation, but, frequently, this phase will persist even at high temperatures, particularly in compositions which are very high in MgO and fluoride. Such persistence is not noted with the fluorborite phase which seems to disappear entirely during mica formation at high temperatures.

It is difficult to ascertain the exact chemical composition of the major fluormica phase in these glass-ceramics. X-ray diffraction analyses indicate only a fluorophlogopite solid solution (s.s.) characterized by a predominantly simple stacking pattern (1 M). Since the percent crystallinity in the products, as determined by replica electron microphotos, ranges between about 55–90% by volume and the composition of the residual glass is not known, identification of the crystals through light microscopy is not possible. Nevertheless, it can be stated that because there are numerous and diverse bulk glass compositions which can be crystallized to about 65% fluormica, and because the residual glassy matrix resists deformation up to 1000° C., thereby arguing an aluminosilicate composition, there is obviously a wide range of fluorophlogophie s.s. involved.

Table I records compositions, expressed in weight percent on the oxide basis, of thermally crystallizable glasses which, when exposed to the heat treatment practice of this invention, were crystallized in situ to relatively uniformly crystalline glass-ceramic articles. The ingredients comprising the glass batches may be any materials, either oxides or other compounds, which, on being melted together are converted to the desired oxide compositions in the proper proportions. The batch ingredients were compounded, ballmilled together to aid in achieving a homogeneous melt, and thereafter melted in closed platinum crucibles for about 6 hours at temperatures ranging between about 1300°–1450° C. The melt was poured onto a steel plate to produce a circular patty about ½″ thick. The glass patties were immediately transferred to an annealer operating at 500°–600° C. Since it is not known with which cations the fluoride is combined, it is simply recorded as fluoride in accordance with conventional glass analytical practice. The retention of fluoride in these compositions was quite high at these melting temperatures, analyses demonstrating losses of less than 25% and, frequently, of only about 5%.

TABLE I

| | Percent | | | | | | | |
|---|---|---|---|---|---|---|---|---|
| | 1 | 2 | 3 | 4 | 5 | 6 | 7 | 8 |
| $SiO_2$ | 43.0 | 44.2 | 42.5 | 44.5 | 43.9 | 37.1 | 37.0 | 43.9 |
| $B_2O_3$ | 5.6 | 11.4 | 4.0 | 4.3 | 8.0 | 12.6 | 12.8 | 8.1 |
| $Al_2O_3$ | 16.4 | 8.5 | 15.5 | 15.9 | 15.7 | 14.2 | 16.7 | 15.7 |
| MgO | 14.5 | 14.9 | 15.4 | 15.9 | 13.8 | 14.4 | 14.8 | 13.8 |
| $K_2O$ | 11.3 | 11.6 | 11.1 | | 10.7 | 11.2 | 11.5 | 10.7 |
| F | 9.2 | 9.4 | 9.1 | 9.4 | 7.9 | 10.5 | 7.1 | 7.9 |
| $Na_2O$ | | | 0.1 | 7.6 | | | | |
| $TiO_2$ | | | 2.3 | 2.4 | | | | |

| | 9 | 10 | 11 | 12 | 13 | 14 | 15 | 16 |
|---|---|---|---|---|---|---|---|---|
| $SiO_2$ | 43.1 | 35.7 | 41.7 | 51.7 | 45.4 | 43.1 | 40.9 | 37.8 |
| $B_2O_3$ | 6.6 | 12.4 | 8.3 | 8.1 | 8.3 | 8.2 | 10.2 | 11.1 |
| $Al_2O_3$ | 15.3 | 16.2 | 16.1 | 14.2 | 16.4 | 16.2 | 16.3 | 16.2 |
| MgO | 14.4 | 14.2 | 14.2 | 13.8 | 16.9 | 19.5 | 19.6 | 21.3 |
| $K_2O$ | 11.2 | 5.3 | 9.3 | 2.7 | 5.4 | 5.4 | 5.4 | 5.4 |
| F | 9.4 | 9.1 | 7.4 | 9.9 | 7.5 | 7.5 | 7.5 | 8.1 |
| CaO | | 7.1 | | 9.6 | 0.1 | 0.1 | 0.1 | 0.1 |

| | 17 | 18 | 19 | 20 | 21 | 22 | 23 | 24 |
|---|---|---|---|---|---|---|---|---|
| $SiO_2$ | 37.4 | 37.2 | 40.6 | 40.9 | 38.1 | 37.9 | 44.3 | 35.6 |
| $B_2O_3$ | 11.0 | 11.0 | 8.3 | 8.3 | 11.3 | 8.3 | 8.6 | 8.6 |
| $Al_2O_3$ | 16.0 | 15.9 | 16.2 | 16.2 | 16.3 | 19.1 | 12.5 | 14.4 |
| MgO | 21.1 | 21.0 | 21.5 | 21.4 | 21.5 | 21.4 | 10.0 | 12.3 |
| $K_2O$ | 5.3 | 6.2 | 3.5 | 4.4 | 4.5 | 4.4 | 11.5 | 11.4 |
| F | 9.1 | 8.6 | 9.8 | 8.7 | 8.2 | 8.7 | 9.4 | 14.0 |
| CaO | 0.1 | 0.1 | 0.1 | 0.1 | 0.1 | 0.1 | | |
| $Li_2O$ | | | | | | | 3.7 | 3.7 |

Following annealing, the glass patties were placed in an electrically-fired furnace and subjected to the heat treatment schedules recorded in Table II. Upon completion of the heat treatment, the electric current to the furnace was cut off and the crystallized articles either removed directly from the furnace into the ambient atmosphere or simply left in the furnace and permitted to cool to room temperature within the furnace. This latter practice has been denominated as "cooling at furnace rate", this rate having been estimated to average about 3°–5° C./minute. In each schedule, the temperature, was raised at a rate of about 5° C./minute to the hold temperature.

Table II also records a visual description, the crystal phases present as identified through X-ray diffraction analyses, and a qualitative measure of machineability of each crystallized article. Measurements of modulus of rupture, dielectric strength at 25° C., dielectric constant at 25° C., 1 kc., dielectric loss tangent at 25° C., 1 kc., electrical resistivity at 500° C., ohm-cm., and the coefficient of thermal expansion over the range 0°–500° C. ($\times 10^{-7}$/° C.) are reported where determined on individual products.

TABLE II

| Example No. | Heat treatment | Visual description | Machineability | Modulus of rupture p.s.i. |
|---|---|---|---|---|
| 1 | 800° C. for 4 hours, 1,100° C. for 4 hours | Cherty fracture, white, slightly translucent | Good | 17,000 |
| 2 | do | Cherty fracture, white, opaque | do | |
| 3 | 800° C. for 4 hours, 1,100° C. for 6 hours | Cherty fracture, beige, opaque | do | 20,000 |
| 4 | 800° C. for 4 hours, 1,000° C. for 6 hours | Cherty fracture, cream, opaque | do | |
| 5 | 750° C. for 2 hours, 1,000° C. for 6 hours | Fine grain fracture, white, opaque | Very good | |
| 6 | 800° C. for 2 hours, 975° C. for 8 hours | Medium grain fracture, white, opaque | Excellent | |
| 7 | 800° C. for 4 hours, 950° C. for 4 hours | Cherty fracture, white, opaque | Very good | |
| 8 | 750° C. for 4 hours, 1,000° C. for 4 hours | do | do | 15,000 |
| 9 | 700° C. for 4 hours, 970° C. for 6 hours | Fine grain fracture, white, opaque | do | |
| 10 | 750° C. for 4 hours, 975° C. for 6 hours | Medium grain fracture, white, opaque | Excellent | |
| 11 | do | Cherty fracture, white, opaque | Good | 15,000 |
| 12 | 750° C. for 4 hours, 980° C. for 4 hours | Coarse grain fracture, white, opaque | Excellent | |
| 13 | 800° C. for 4 hours, 1,050° C. for 6 hours | Fine grain fracture, white, opaque | do | |
| 14 | 750° C. for 4 hours, 1,080° C. for 6 hours | do | do | |
| 15 | 800° C. for 4 hours, 1,060° C. for 4 hours | Medium grain fracture, white, opaque | do | |
| 16 | 800° C. for 4 hours, 1,030° C. for 4 hours | Fine grain fracture, white, opaque | do | |
| 17 | do | do | do | 9,000 |
| 18 | do | Cherty fracture, white, opaque | Good | |
| 19 | 800° C. for 4 hours, 1,040° C. for 4 hours | Medium grain fracture, white, opaque | Excellent | |
| 20 | 800° C. for 4 hours, 1,040° C. for 4 hours | Fine grain fracture, white, opaque | do | 11,000 |
| 21 | 800° C. for 4 hours, 1,040° C. for 4 hours | Medium grain fracture, white, opaque | do | 25,000 |
| 22 | 800° C. for 4 hours, 1,040° C. for 4 hours | Fine grain fracture, white, opaque | Good | |
| 23 | 650° C. for 4 hours, 800° C. for 4 hours | Cherty fracture, white, opaque | do | |
| 24 | do | Fine grain fracture, white, opaque | do | |

TABLE II—Continued

| Example No. | Dielectric strength, v./mil | Dielectric constant | Loss tangent | Resistivity | Coefficient of expansion | Crystal phases |
|---|---|---|---|---|---|---|
| 1 | | | | | | Fluorophlogopite s.s., sellaite. |
| 2 | | | | | | Fluorophlogopite s.s. |
| 3 | 400 | 6.4 | 0.004 | 10⁷ | 100 | Fluorophlogopite s.s., sellaite. |
| 4 | | | | | | Do. |
| 5 | | | | | | Fluorophlogopite s.s. |
| 6 | | 6.4 | 0.018 | 10⁷ | | Do. |
| 7 | | | | | | Fluorophlogopite s.s., fluoborite. |
| 8 | 1,900 | 6.4 | 0.003 | 10⁷ | 100 | Fluorophlogopite s.s. |
| 9 | | | | | | Do. |
| 10 | | | | | | Do. |
| 11 | | | | | | Do. |
| 12 | | | | | | Do. |
| 13 | | 7.9 | 0.002 | 10⁸ | | Do. |
| 14 | | | | | | Do. |
| 15 | | 1,200 | | | | Do. |
| 16 | | | | | | Do. |
| 17 | | 6.1 | 0.001 | 10¹¹ | | Do. |
| 18 | | | | | | Do. |
| 19 | | | | | | Do. |
| 20 | 1,100 | 5.7 | 0.001 | 10¹¹ | | Do. |
| 21 | 800 | | | | | Do. |
| 22 | | | | | | Fluorophlogopite s.s., unidentified aluminous phase. |
| 23 | | | | | | Fluorophlogopite polylithionite s.s. |
| 24 | | | | | | Do. |

Table II illustrates the range of physical characteristics that products of the instant invention can demonstrate. The degree of machineability is dependent upon the size and amount of crystallization. Hence, glass-ceramic articles containing the most residual glass will be the hardest but, where the amount of residual glass is held constant, those articles containing fine-grained crystals and/or crystals with a low aspect ratio will tend to be harder. To optimize machineability and the softness upon which this property depends, the glass-ceramic article should be composed of a high percent mica crystallinity with a large aspect ratio (at least 5:1 to give a platy habit). The mica glass-ceramics within my preferred range of compositions can be readily drilled, cut with a hack saw, and machined on a lathe.

It should be noted that although many glass-ceramic compositions can be formed containing mica-type crystals, machineability has not been observed in glass-ceramic products in the simple fluorophlogopite system $K_2O-MgO-Al_2O_3-SiO_2-F$ although some phlogopite can be crystallized therein. This situation is probably the result of two factors: first, the fluorophlogopite crystals do not comprise more than 50% of the articles; and, second, the grain size and aspect ratio of the crystals therein are normally small.

Modulus of rupture values can vary between about 10,000–20,000 p.s.i., these again depending upon the composition and structure of the glass-ceramic articles. Normally, higher strengths will be attained where the grain size is quite fine, e.g., 1–5 microns. Microstructure is a second important factor affecting strength. Spherulitic or dendritic intergrowths of mica invariably produce weak bodies, i.e., modulus of rupture values less than 10,000 p.s.i. As opposed to this, an interlocking of the fluorophlogopite crystals, as is achieved with the combination of a high degree of crystallinity coupled with a high crystalline aspect ratio, appears to be the most desirable for securing good mechanical strength (FIG. 2).

The coefficients of thermal expansion of these mica glass-ceramic materials are relatively high, e.g., between about $90-150 \times 10^{-7}/°$ C. over the temperature range 0°–500° C. Yet, the thermal shock resistance of the materials has been demonstrated to approach that of Corning Code 7900 Vycor® brand articles, i.e., a coefficient of thermal expansion of about $8 \times 10^{-7}/°$ C. Thus, ground slabs of Example 22 about ¼" in thickness were compared directly to Corning Code 7900 glass and Corning Code 7740, a boro-silicate glass sold under the trademark Pyrex® and having a coefficient of thermal expansion of about $32.5 \times 10^{-7}/°$ C. Samples were water-quenched after being taken from a furnace operating at temperatures ranging from 300° C. up to 900° C. The mica glass-ceramic and Corning Code 7900 glass exhibited no breakage upon quenching up to 900° C., whereas Corning Code 7740 glass did not even survive the shock from 300° C. The explanation for this remarkable phenomenon is again believed to be founded in the peculiar interlocking microstructure of platy and individually flexible mica sheet which permits adjustment to thermal shrinkage or, at the very least, acts to retard or prevent the initiation of cracks caused by rapid shrinkage.

The most advantageous dielectric properties are usually obtained with compositions containing no $Li_2O$ or $Na_2O$ and less than 6% $K_2O$. Furthermore, a high degree of crystallinity and a high crystalline aspect ratio are also beneficial. The DC resistivity, particularly at high temperatures, has been observed to be excellent with many compositions. For example, Table II reports log resistivity values at 500° C. up to 11 (Examples 17 and 20). Example 8 manifests a dielectric strength of 1900 volts/mil. This measurement is about five times that of commercial electrical glass, electrical porcelain, and glass-bonded mica. Dielectric constants, which are not significantly sensitive to temperatures in these materials, generally range between 5.5–9.0 with dielectric loss tangents determined at room temperature as low as 0.0010 at frequencies about 1 kHz.

Electron microscopy and X-ray diffraction analyses have indicated the presence of minor amounts of crystallization extraneous to the desired fluorophlogopite solid solution (vide Examples 1, 3, 4, 7, and 22–24). However, it has been estimated that the sum of all such crystallization does not exceed about 15% of the total crystallization.

I claim:

1. A glass-ceramic article exhibiting a dielectric constant at 25° C., 1 kc., ranging between about 5.5–9.0, good machineability, and a coefficient of thermal expansion varying between about $90-150 \times 10^{-7}/°$ C. consisting essentially of interlocking platelets of fluorophlogopite solid solution crystals characterized by a predominantly simple stacking pattern (1 M) dispersed in a glassy matrix, said crystals having a grain size greater than 5 microns and a crystalline aspect ratio of at least 5:1, constituting at least 50% but no more than about 90% by volume of the article, and being formed through the crystallization in situ of a glass body consisting essentially, by weight on the oxide basis, of about 25–60% $SiO_2$, 15–35% $R_2O_3$, wherein $R_2O_3$ consists of 5–15% $B_2O_3$ and 5–25% $Al_2O_3$, 2–20% $R_2O$, wherein $R_2O$ consists of 0–15% $K_2O$, 0–15% $Na_2O$, 0–15% $Rb_2O$, and 0–20% $Cs_2O$, 4–25% $MgO + 0$–7% $Li_2O$, wherein the total $MgO + Li_2O$ consists of 6–25%, and 4–20% F.

2. A glass-ceramic article according to claim 1 wherein said glass body consists essentially, by weight on the oxide basis, of about 35–48% $SiO_2$, 5–15% $B_2O_3$, 14–22% $Al_2O_3$, 15–25% MgO, 3–8% $K_2O$, and 5–10% F.

References Cited

UNITED STATES PATENTS

| 3,149,947 | 9/1964 | Eppler et al. | 106—39 DV |
|---|---|---|---|
| 3,325,265 | 6/1967 | Stookey | 106—39 DV |

FOREIGN PATENTS

| 247,589 | 10/1963 | Australia | 106—39 DV |
|---|---|---|---|

JAMES E. POER, Primary Examiner

M. L. BELL, Assistant Examiner

U.S. Cl. X.R.

106—54